Sept. 3, 1940.   T. KOCH ET AL   2,213,865
METHOD OF WELDING SOLDER TO A TOOTH PIN
Filed Jan. 10, 1938
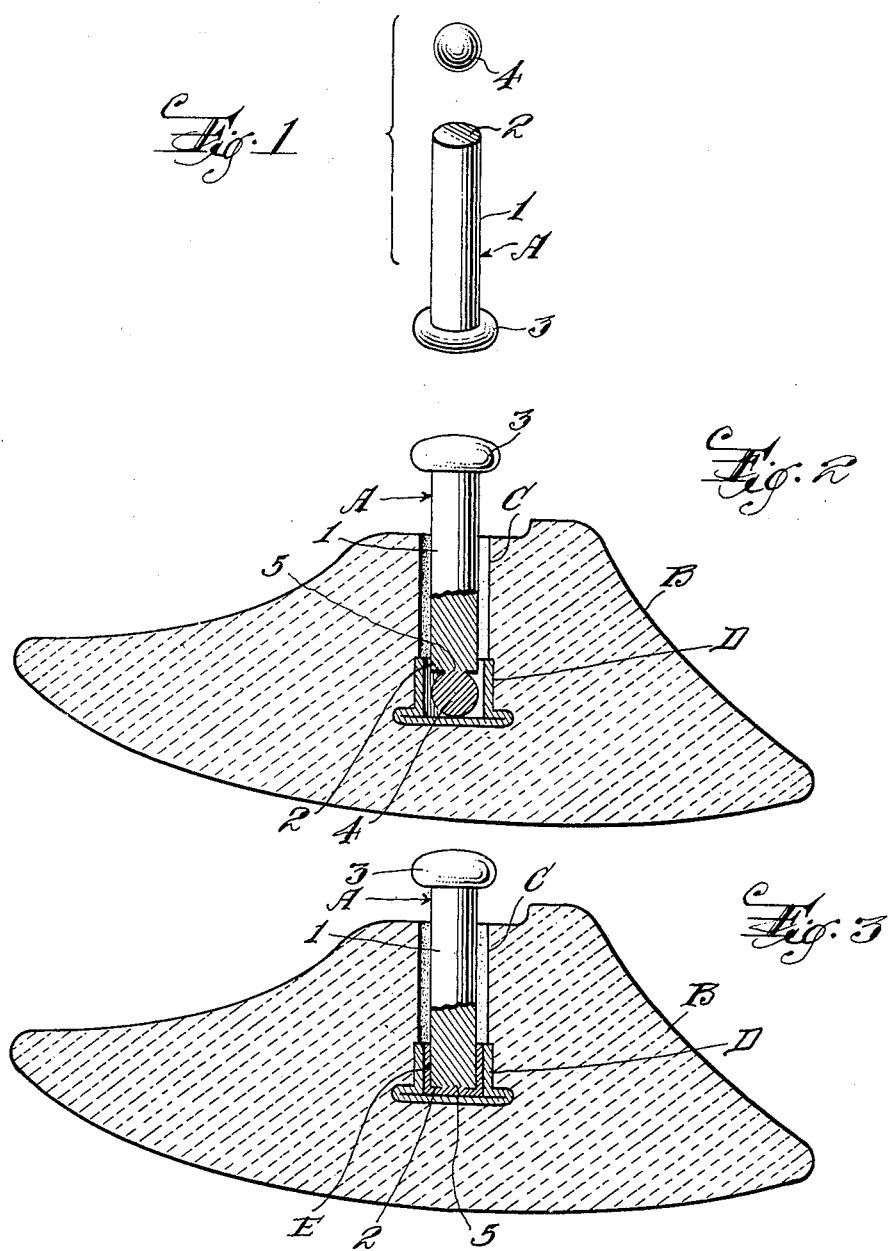
INVENTORS
Theodor Koch and
Otto W. Langhans,
BY Harry B. Kook.
ATTORNEY Patented Sept. 3, 1940

2,213,865

UNITED STATES PATENT OFFICE 2,213,865

METHOD OF WELDING SOLDER TO A TOOTH PIN

Theodor Koch, Newark, and Otto W. Langhans, Caldwell, N. J., assignors to American Platinum Works, Newark, N. J. a corporation of New Jersey Application January 10, 1938, Serial No. 184,154

2 Claims. (Cl. 219—10)

This invention relates in general to artificial teeth and in particular to artificial teeth provided with anchorages to which tooth pins are soldered for retaining the teeth in vulcanite or other denture base materials.

Such artificial teeth are generally formed of porcelain or similar compositions and are provided with openings or cavities at or near the bottom of which there is embedded a metal anchorage, usually in the form of a cup, ring, or disc, to which is soldered a tooth pin projecting from the lingual side of the tooth for use in retaining the tooth in the vulcanite or other denture base material. The pins themselves are extremely small, being approximately .130" in length and about .027" in diameter, and usually are provided with a head.

It is customary practice in the manufacture of such artificial teeth to first insert into the cavity a small piece of solder in the form of a disc or the like. Thereafter the end of the pin is inserted resting on the solder. The entire artificial tooth, with solder and pin inserted in the cavity, are then heated. During the heating the solder fuses and the pin becomes firmly embedded therein, thus becoming secured in position within the surrounding anchorage.

Great difficulties, however, are encountered in thus soldering the pin to the anchorage, especially in the application of the solder. The insertion of solder and pin consumes a considerable amount of time as both operations are carried out by hand and the objects operated with are extremely small. Also, through oversight or carelessness of the operator, solder may be omitted before the pins are inserted, thus necessitating the discarding of the tooth and the scrapping of the precious metal anchorage because the tooth cannot be heated a second time in view of the fact that such excessive heating would imperil the quality of the color of the tooth.

Various attempts have been made to overcome these difficulties, for example by using a cup-shaped body of solder having a thin annular flange mechanically stretched about and cold pressed upon the pin prior to the insertion of the pin. Such attempts, however, have been relatively complicated and clumsy and have failed to solve the basic difficulties.

The same may be said of any attempt to weld or fuse the aforementioned cup-shaped body or disc of solder on the end of the pin. This will be understood when it is remembered that the disc or cup of solder is necessarily extremely small in diameter and thickness. Moreover, the disc or cup when attached to the pin must be of a diameter substantially the same as or smaller than the tooth pin, i. e. about .027 of an inch, in order to enter the anchorage, but the disc or cup would be difficult to handle and while in molten state and under even slight pressure during the welding operation, would be squeezed too thin and increased in diameter and deformed to such an extent as to project beyond the sides of the pin, so that insertion of the pin into the anchorage would be hindered and the soldering of the pin to the anchorage would be defective.

Therefore, in spite of such attempts it is still general practice to first insert a piece of solder and then insert the pin into the anchorage, separately and in successive operations.

A prime object of our invention is to provide a novel and improved tooth pin which shall have a piece of solder of such form fixedly attached to the end of the pin in such a manner as to permit the pin with the attached solder as a unit to be easily inserted into and easily and firmly secured in a cup, disc or ring anchorage of an artificial tooth, and thereby overcome the difficulties heretofore encountered in attaching pins to artificial teeth.

Other objects are to provide a novel and improved method of fixedly attaching a piece of solder to the end of a tooth pin wherein the piece of solder shall be of such shape as both to facilitate handling thereof and ensure a firm and accurate attachment thereof to the pin; and to obtain other results and advantages as will appear from the following description.

With these objects in view, the invention contemplates a tooth pin which shall have a substantially spherical piece or ball of solder fixedly attached, as by electric welding, upon the flat headless end of the pin. The ball of solder may be sufficiently small in diameter and at the same time have adequate body or thickness to resist excessive deformation under the pressure incident to welding, and due to the flat end of the pin and the spherically curved surface of the ball of solder, the ball will have only a "point" contact with the pin so that the ball can be welded easily, quickly and firmly on the pin with a minimum fusion of the solder and a minimum possibility of detrimental deformation of the ball.

Referring to the accompanying drawing in which corresponding and like parts are designated by the same reference characters, Figure 1 is a composite perspective view, on a greatly enlarged scale, of a tooth pin and a ball of solder to be attached thereto showing it before attachment of the ball to the pin.

Figure 2 is a vertical longitudinal sectional view through an artificial tooth having a cup pin anchorage and showing the pin and solder unit inserted into the anchorage prior to fusing of the solder, and Figure 3 is a similar view showing the pin completely soldered in the anchorage.

Specifically describing the invention, the reference character A generally designates a tooth pin which has a shank 1 having one flat headless end 2 and a head 3 at the opposite end. The pin is extremely small, the length being of the order of .130 of an inch and the diameter being of the order of .027 of an inch.

In accordance with the invention a small approximately spherical piece of solder 4 which is of a diameter not substantially greater than the diameter of the pin is fixedly attached to the headless end of the pin as by welding, especially by electric welding, so that the pin and spherical piece or ball of solder may be handled as a unit in attaching the pin to an artificial tooth.

The pin unit is adapted for use with artificial teeth having recesses at the bases of which are metallic cup, disc, or ring anchorages to which the tooth pins are to be soldered. For illustrating the invention, we have shown an artificial tooth B having a recess C on its lingual side at the base of which is a cup anchorage D.

The spherical piece or ball of solder 4 may be fixedly or integrally secured to the end of the pin shank in any suitable manner, but preferably by electric welding.

The welding operation is preferably of the type known as resistance welding and may be carried out by means of any suitable welding machine or mechanism.

The electric current is caused to flow through the pin and the ball of solder so as to weld the ball to the pin. During this operation the ball will have a point contact with the flat end 2 of the pin, and the end of the pin and the portion of the ball of solder at the zone of contact with the pin will be heated quickly to the fusing point of the solder so as to produce a substantial weld of the ball to the pin as indicated at 5. The circuit should be broken before the shank of the pin and the major portion of the ball of solder have been heated to the fusing temperature of the solder.

Any suitable mechanism may be utilized to bring about the contact of the ball of solder with the shank of the pin. In this connection it will be observed that the balls of solder are especially easy to handle in that they will roll easily.

The welding operation can be effected quickly with a minimum fusion of the solder and a minimum possibility of deformation of the ball under pressure incident to the welding operation. The side or zone of the ball in contact with the pin will be slightly flattened as shown in Fig. 2, but the remainder of the ball will retain its spherical form and will not be deformed or increased in diameter substantially beyond the size of the pin shank, and accordingly substantially all of the solder will lie within the projected area of the end of the pin.

The voltage of the circuit used in resistance welding may be very low, for example from two to thirty volts. Due to the low voltage of the current no special insulation is required and the apparatus may be simple and relatively inexpensive. While we have used the term "point contact" it should be understood that the term refers to the physical contact of the ball and pin and not to "spot welding" as that term is understood generally.

The spherical pieces or balls of solder may be obtained in any suitable manner.

In attaching the pin unit including the pin and the integrally associated ball of solder to an artificial tooth, the end of the pin unit carrying the solder is slipped into the anchorage D of the tooth, after which the pin and tooth are simultaneously heated to the fusing temperature of the solder. Thereupon the solder will run over the juxtaposed surface of the pin and metal anchorage D as indicated at E in Figure 3 so as to firmly secure the pin in the anchorage.

The welding of the ball of solder to the pin prior to soldering of the pin in the anchorage, enhances the security of the attachment of the pin to the anchorage, because during the soldering operation the weld remains substantially intact during the soldering of the pin in the anchorage. Moreover, the spherical shape of the solder facilitates the displacement and dispersement of the molten solder over the adjacent surfaces of the pin and metal anchorage as the pin is pressed into anchorage.

Having thus described our invention, what we claim is:

1. The method of securing on the end of a tooth pin a piece of solder which has a relatively lower melting point than said pin, consisting in forming a quantity of such solder into an approximately spherical piece of a diameter not substantially greater than the diameter of the pin, causing contact of the end of the pin with said spherical piece of solder at a point only, and passing an electric current through said pin and said piece of solder while they are in contact with each other and fusing only the portion of the solder at the zone of contact to weld the solder and pin together with substantially all of the solder lying within the projected area of said end of the pin.

2. The method of securing solder having a relatively low melting point to the flat end of a tooth pin which has a relatively high melting point, comprising bringing an approximately spherical piece of such solder of a diameter not substantially greater than the diameter of the pin into light contact with the flat end of the tooth pin at a point only, causing an electric current to pass through said piece of solder and said pin while they are in such contact to fuse the solder at the zone of contact only with substantially all of the solder lying within the projected area of the end of the pin, and stopping the passage of current through the solder and pin before the shank of said pin and the major portions of said piece of solder have been heated to the fusing temperature of the solder.

THEODOR KOCH.
OTTO W. LANGHANS.